(12) United States Patent
Simendinger, III et al.

(10) Patent No.: US 6,702,953 B2
(45) Date of Patent: Mar. 9, 2004

(54) ANTI-ICING COMPOSITION

(75) Inventors: William H. Simendinger, III, Raleigh, NC (US); Shawn D. Miller, Raleigh, NC (US)

(73) Assignee: Microphase Coatings, Inc., Garner, NC (US)

(*) Notice: Subject to any disclaimer, the term of this patent is extended or adjusted under 35 U.S.C. 154(b) by 169 days.

(21) Appl. No.: 10/021,144

(22) Filed: Dec. 12, 2001

(65) Prior Publication Data

US 2002/0139956 A1 Oct. 3, 2002

Related U.S. Application Data

(60) Provisional application No. 60/255,864, filed on Dec. 14, 2000.

(51) Int. Cl.$^7$ .................. C09K 3/18; C09D 183/04; C09D 163/00; C08L 83/04
(52) U.S. Cl. .................. 252/70; 106/13; 427/386; 428/447
(58) Field of Search .................. 252/70; 106/13; 427/386; 428/447

(56) References Cited

U.S. PATENT DOCUMENTS

| | | | | |
|---|---|---|---|---|
| 4,271,215 A | * | 6/1981 | Coon | 106/13 |
| 4,448,919 A | * | 5/1984 | Murase | 524/327 |
| 4,602,959 A | | 7/1986 | Kurita et al. | 106/18.32 |
| 4,725,501 A | | 2/1988 | Rukavina et al. | 428/412 |
| 4,774,112 A | * | 9/1988 | Achtenberg et al. | 106/13 |
| 4,814,017 A | | 3/1989 | Yoldas et al. | 106/287.12 |
| 4,816,288 A | | 3/1989 | Rukavina et al. | 427/387 |
| 4,990,547 A | | 2/1991 | Stovicek | 424/405 |
| 5,035,934 A | * | 7/1991 | Tomiyama et al. | 106/13 |
| 5,045,599 A | * | 9/1991 | Murase | 525/102 |
| 5,068,277 A | | 11/1991 | Vukov et al. | 524/441 |
| 5,096,488 A | | 3/1992 | Stovicek | 106/18.32 |
| 5,173,110 A | | 12/1992 | Stovicek | 106/18.32 |
| 5,188,750 A | * | 2/1993 | Kogure et al. | 106/13 |
| 5,218,059 A | | 6/1993 | Kishihara et al. | 525/477 |
| 5,298,060 A | | 3/1994 | Harakal et al. | 106/15.05 |
| 5,331,074 A | | 7/1994 | Slater, deceased et al. | 528/14 |
| 5,433,941 A | | 7/1995 | Patel | 424/50 |
| 5,593,732 A | | 1/1997 | Griffith | 427/407.1 |
| 5,663,215 A | | 9/1997 | Milligan | 523/122 |
| 5,688,851 A | | 11/1997 | Kress | 524/430 |
| 5,939,478 A | | 8/1999 | Beck et al. | 524/266 |
| 5,958,116 A | | 9/1999 | Kishihara et al. | 106/15.05 |
| 6,013,724 A | | 1/2000 | Mizutani et al. | 524/588 |
| 6,045,869 A | | 4/2000 | Gesser et al. | 427/385.5 |
| 6,313,193 B1 | * | 11/2001 | Simendinger, lll | 523/122 |
| 6,361,871 B1 | * | 3/2002 | Jenkner et al. | 427/387 |
| 6,432,191 B2 | * | 8/2002 | Schutt | 106/287.11 |

FOREIGN PATENT DOCUMENTS

| | | | | |
|---|---|---|---|---|
| EP | 0851009 | | 7/1998 | C09D/5/16 |
| JP | 61-51069 | * | 3/1986 | |
| WO | WO 0114497 | | 3/2001 | C09K/3/18 |
| WO | WO 0194487 | | 12/2001 | C09D/183/00 |

OTHER PUBLICATIONS

Derwent Abstract No. 1993–141611, abstract of Soviet Union Patent Specification No. 1731784 (May 1992).*
International Search Report corresponding to PCT/US01/48689 Mailed on Jul. 30, 2002.
Mera et al.; "Toward Minimally Adhesive Surfaces Utilizing Siloxanes" *Naval Research Reviews* XLIX:4 1–65 (1997) (No Month).

* cited by examiner

*Primary Examiner*—Anthony J. Green
(74) *Attorney, Agent, or Firm*—Myers Bigel Sibley & Sajovec, PA

(57) ABSTRACT

The anti-icing composition of the present invention includes a glassy matrix formed by crosslinking a mixture of a functionally-terminated silicone and an alkoxy-functionalized siloxane to provide an interpenetrating polymer network of glass and silicone, at least two materials capable of microphase separation, at least one of which is graftable to the glassy matrix and a freezing point depression agent. The present invention also provides a glass matrix formed by crosslinking a mixture of an epoxy, an alkoxy-functionalized siloxane, and a compound capable of compatibilizing the epoxy and the alkoxy-functionalized silaxane to provide an epoxy-modified interpenetrating polymer network of glass and epoxy.

52 Claims, No Drawings

ANTI-ICING COMPOSITION

RELATED APPLICATION

This application claims priority from U.S. Provisional Application 60/255,864, filed Dec. 14, 2000, the disclosure of which is incorporated by reference herein in its entirety.

STATEMENT OF FEDERAL SUPPORT

This invention was made, in part, with government support under grant number SBIR I Purchase Order (PO) Number F33615-01-M-5605 from the Department of the Air Force. The United States government may have certain rights to this invention.

FIELD OF THE INVENTION

The present invention relates to an anti-icing composition suitable for use on a variety of substrates, and which is particularly suited for use on substrates related to aircraft environments.

BACKGROUND OF THE INVENTION

Various modes of transportation are at risk of dire consequences due to the build-up of ice during cold or winter conditions. Aircraft that are either parked on the ground or are on the ground between flights can accumulate snow, ice, freezing rain, or frost on the aircraft surfaces and aircraft engine components in cold weather. Such accumulation, particularly on airfoil surfaces, is generally an unsafe airfoil condition in that it hampers and can stop liftoff. Additionally, ice build up during flight can be a problem. The jet engines of airplanes are also at risk of unexpected flame out if ice builds up on certain components of the engine. Additionally, such ice buildup may break off into large chunks which when impacted against components of the engine can cause significant damage. Thus, there is a need for a coating that can effectively reduce the amount of ice build up on surfaces, including those on aircraft, under harsh weather conditions.

SUMMARY OF THE INVENTION

The anti-icing composition of the present invention includes a glassy matrix preferably formed by crosslinking a mixture of a functionally-terminated silicone and an alkoxy-functionalized siloxane to provide an interpenetrating polymer network ("IPN") of glass and silicone. Grafted to the matrix is a material capable of microphase separation. The material capable of microphase separation is at least two liquid materials, at least one of which is graftable to the matrix. Also included in the material is a freezing point depression agent such as a polyol or salt hydrate. Such a freezing point depression agent may itself be a material capable of microphase separation.

In an alternative embodiment, the present invention provides an anti-icing composition comprising a crosslinked mixture of an epoxy, an alkoxy-functionalized siloxane and a compound (e.g., silane) capable of compatabilizing the epoxy and the alkoxy-functionalized siloxane to provide an epoxy-modified interpenetrating polymer network of glass and epoxy. Grafted to the matrix is the material capable of microphase separation. The composition also includes a freezing point depression agent.

The present invention also provides a substrate such as an airplane wing coated with either the composition including the interpenetrating polymer network of glass and silicone or the composition including the interpenetrating polymer network of glass and epoxy.

DETAILED DESCRIPTION OF THE PREFERRED EMBODIMENTS

The present invention will be more fully understood by reference to the following description and examples. Variations and modifications of the embodiments of the invention can be substituted without departing from the principles of the invention, as will be evident to those skilled in the art.

As previously discussed the present invention provides a glassy matrix preferably formed by crosslinking a mixture of a functionally-terminated silicone and an alkoxy functionalized siloxane to provide an interpenetrating polymer network ("IPN") of glass and silicone. Grafted to the matrix is a material capable of microphase separation. The material capable of microphase separation is at least two liquid materials, at least one of which is graftable to the matrix. Also included in the material is a freezing point depression agent such as a polyol or salt hydrate. Such a freezing point depression agent may itself be a material capable of microphase separation. Such a glassy matrix is described in U.S. Ser. No. 09/586,378 filed Jun. 2, 2000, the disclosure of which is incorporated by reference herein in its entirety.

Alternatively, the anti-icing composition comprises a crosslinked mixture of an an epoxy, an alkoxy-functionalized siloxane and a silane capable of compatabilizing the epoxy and the alkoxy-functionalized siloxane to provide an epoxy-modified interpenetrating polymer network of glass and epoxy. Grafted to the matrix is the material capable of microphase separation. The composition also includes a freezing point depression agent.

The glassy matrix is crosslinked using a titanium or tin catalyst. Suitable catalysts include titanium, without limitation, alkoxides such as titanium methoxide, titanium ethoxide, titanium isopropoxide, titanium propoxide, titanium butoxide, titanium diisopropoxide (bis 2,4-pentanedionate), titanium diisopropoxide bis (ethylacetoacetao) titanium ethylhexoxide, and organic tin compounds such as dibutyl tin diacetate, dibutyltin laurate, dimethyl tin dineodecanoate, dioctyl dilauryl tin, and dibutyl butoxy chlorotin, as well as mixtures thereof.

The matrix formulation can include a silica gel including propionic or octonoic acid to inhibit the crosslinking reaction so that the anti-icing composition can be applied to the surface to be coated. The glassy matrix can be formed by using a Sol-Gel process such as described in U.S. Ser. No. 09/586,378. Other methods of forming the matrix will be within the skill of one in the art. The matrix formulation may also include fillers such as, without limitation, fumed silica, mica, kaolin, bentonite, talc, zinc oxide, iron oxide, cellulose, pigments, polytetrafluoroethylene powder, ultra high molecular weight polyethylene powder, high, medium and low molecular weight polyethylene powder, or other fillers, as will be readily apparent to those skilled in the art. The glassy matrix formulation may further include carbon black, silicon powder, doped zinc oxide and polyaniline. Such additives can be used to modify the resistive or dielectric or both properties of the anti-icing composition.

The glassy matrix serves to provide a carrier or support material for the material capable of microphase separation. The matrix provides good adhesion to the surface being coated, as well as, toughness, crack resistance, durability, abrasion resistance and stability in the particular environment.

The anti-icing composition of the present invention also includes a material capable of microphase separation. The material comprises at least two liquids, which in addition to its separation aspects, one of which is capable of being grafted into the glassy matrix. A material capable of microphase separation is a material that because of physical or chemical interactions between (among) the liquid materials substantially continuously phase separates or moves.

Suitable functionally-terminated silicones include silanol terminated, vinyl terminated and amino terminated polydimethylsiloxane. Such silicones have low tear strength and can be toughened by incorporating glass ($SiO_2$) into the structure. Thus, an alkoxy-functionalized siloxane can be included. Suitable alkoxy-functionalized siloxanes include polydiethoxysiloxane, tetraethoxy silane, tetramethoxy silane, and polydimethoxy siloxane.

One manner of forming the glassy matrix is using a Sol-Gel process employing a catalyst agent such as an organotitanate compound, for example, a titanium alkoxide compound such as, but not limited to, titanium methoxide, titanium ethoxide, titanium isopropoxide, titanium propoxide, titanium butoxide, titanium ethylhexoxide, titanium diisopropoxide (bis 2,4 pentanedionate), titanium diisopropoxide bis(ethylacetoacetate), or any other type of titanium alkoxide compound. These titanium alkoxide compounds can be used separately or in any combination. Although titanium alkoxides are given as examples, other organotitanate compounds can be used. The glassy matrix can also include a carboxylic acid compound. Silica gel is optional to inhibit the crosslinking reaction. Silica gel is used if storage over a long period of time is an issue. This is because it is believed to store moisture. Alternatively, only silica gel can be used in place of the carboxylic acid compound. However, this does not work as well and a lot of silica gel is required.

With respect to the Sol-Gel process, as is well know to those of ordinary skill in the art, the Sol-Gel process is conventional, and typically produces a Sol-Gel glass which results from an optically transparent amorphous silica or silicate material produced by forming interconnections in a network of colloidal submicrometer particles under increasing viscosity until the network becomes completely rigid, with about one-half the density of glass.

One of the materials capable of microphase separation and graftable into the glassy matrix may be a vinyl terminated polydimethyl siloxane polymer reacted with dimethylethoxy silane or 1,1,3,3 tetramethyl disiloxane and triethyl silane using a hydrosilylation reaction. Another microphase separated material which can be employed is a methylhydrosiloxane polymer which is side-chain grafted with octene and vinyltriethoxy silane using a platinum-activated hydrosilylation reaction.

Alternatively, the glassy matrix can comprise a crosslinked mixture of an epoxy, an alkoxy-functionalized siloxane and a silane capable of compatabilizing the epoxy and the alkoxy-functionalized siloxane to provide the interpenetrating polymer network of glass and epoxy. Epoxy compounds are well know and are described in, for example, U.S. Pat. Nos. 2,467,171; 2,615,007; 2,716,123; 3,030,336; and 3,053,855 which are incorporated herein in their entirety by reference. Useful epoxy compounds include the polyglycidyl ethers of polyhydric polyols, such as ethylene glycol, triethylene glycol, 1,2-propylene glycol, 1,5-pentanediol, 1,2,6-hexanetriol, glycerol and 2,2-bis(4-hydroxy cyclohexyl) propane; the polyglycidyl esters of aliphatic or aromatic polycarboxylic acids, such as oxalic acid, succinic acid, glutaric acid, terephthalic acid, 2,6-naphthalene dicarboxylic acid and dimerized linoleic acid; the polyglycidyl ethers of polyphenols, such as 2,2-bis(4-hydroxyphenyl) propane (commonly known as bis-phenol A), 1,1-bis(4-hydroxyphenyl) ethane, 1,1-bis(4-hydroxyphenyl) isobutane, 4,4'-dihydroxybenzophenone, 2,2-bis(4-hydroxyphenyl) butane, bis(2-dihydroxynaphthyl) methane, phloroglucinol, bis(4-hydroxyphenyl)sulfone, 1,5-dihydroxynaphthalene, and novolak resins; with the polyglycidyl ethers of a polyphenol, polybisphenol A-epichlorohydrin glycidyl end-capped and polybisphenol F-epichlorodydrin glycidyl end-capped. being currently preferred.

Generally the preferred epoxy compounds are resins having an epoxide equivalent weight of about 100 to 2000, preferably about 110 to 500. A presently preferred epoxy is EPON 862 available from Resolution Performance Products, Houston, Tex.

Suitable additives for the epoxy modified matrix include curing agents (e.g., Ancamide 862, a polyamide curing agent available from Air Product, Allentown, Pa). Silanes capable of compatibilizing the epoxy and the alkoxy-functionalized siloxane include 3-(glycidoxypropyl)trimethoxysilane) and amino propyl triethoxy silane. Benzyl Alcohol can also be used to help compatibalize the epoxy and alkoxy-functionalized siloxane.

The freezing point depression agent is preferably a polyol which reduces the freezing point of water that comes in contact with the surface to which the anti-icing composition is applied. The freezing point depression material can itself be liquid phase separable and will move or bloom to the exposed surface. Suitable freezing point depression agents include various alcohols, polyols, water soluble salts and polyol fatty acid esters. Preferred agents include polypropylene glycol, polyethylene glycol, diethylene glycol, triethylene glycol, propylene glycol, ethylene glycol, sorbitol, glycerol, sodium acetate and potassium acetate. Such agents can be combined with other freezing point depression agents, for example, choline and various salts such as magnesium chloride hexahydrate, $CaCl_2$, and NaCl.

Either of the anti-icing compositions preferably comprise about 20 to 90 percent by weight of the glassy matrix; the liquid material capable of liquid phase separation preferably comprises about 1 to 30 percent by weight of the composition; and the freezing point depression agent preferably comprises about 0.1 to 50 percent by weight of the composition. As previously stated the various compositions may also include additives which modify the resistive or dielectric properties of the coating. Such additives and modifications are important when used in aircraft wherein radar absorbent materials are to be used, e.g., the U.S. military's B2 bomber, to protect aircraft from lightening strikes, and to reduce electrostatic discharge.

In operation, the anti-icing composition of the present invention can be applied by roll-coating, brush, spray coating dipping and the like. As discussed above, it is preferred that the user, mix the catalyst with the other components right before or substantially contemporaneously with application. The composition is preferably applied at a thickness of about 0.25 mm to 1.0 mm.

EXAMPLES

The following specific examples are provided to afford a better understanding of the present invention to those skilled in the art. It is to be understood that these samples are intended to be illustrative only and are not intended to limit the invention in any way.

| Component | wt (g) | wt % |
|---|---|---|
| *Example 1 (rubbery)* | | |
| Polydiethoxy siloxane | 13.15 | 23.69 |
| Silanol terminated polydimethyl siloxane (MW = 4200 g/mol) | 21.0 | 37.82 |
| Fumed silica | 4.00 | 7.20 |
| Dimethyl ethoxy and triethyl silane terminated PDMS | 4.81 | 10.00 |
| Polypropylene glycol | 4.81 | 10.00 |
| Dibutyl tin diacetate or dibutyl tin dilaurate | 0.33 | 0.60 |
| *Example 2 (hard)* | | |
| Polydiethoxy siloxane | 13.15 | 34.67 |
| Silanol terminated polydimethyl siloxane (MW: 4200 g/mol) | 7.00 | 18.46 |
| Fumed silica | 4.00 | 10.55 |
| Dimethyl ethoxy and triethyl silane terminated PDMS | 3.77 | 10.00 |
| Polypropylene glycol | 3.77 | 10.00 |
| Titanium di-isopropoxide bis 2,4 pentanedionate 75% in isopropanol | 6.00 | 15.82 |
| Dibutyl tin diacetate or dibutyl tin dilaurate | 0.23 | 0.60 |
| *Example 3 (Ice Phobic Polymeric System)* | | |
| Epon ™ (Shell) 862 Epoxy Resin | | 19.8 |
| Ancamide ™ (Air-Products) 802 Curing Agent | | 19.8 |
| Polydiethoxysiloxane | | 12.8 |
| 3-Aminopropyltriethoxysilane | | 6.4 |
| Dibutyltin dilaurate | | 1.4 |
| [3-Glycidoxypropyl] trimethoxysilane | | 10.6 |
| 1/1 mixture [Glycerol and Magnesium Chloride Hexahydrate] | | 21.4 |
| Silanol Terminated Polydimethylsiloxane | | 4.3 |
| Monofunctionally terminated silicone | | 2.8 |
| Pigment | | 0.7 |

Testing on Example 3

A vortex generator was simulated in an icing wind tunnel at Cox & Company, New York, N.Y. by placing a steel metal plate in the icing wind tunnel. In aircraft, vortex generators are used for funneling air through the intake of aircraft engines. During pre-flight warm up, water can condense and freeze on the vortex generator forming areas of dense ice. As throttle is increased, the chunks of ice can break free and potentially cause engine damage.

The first test was run at 28° F. with an initial angle of attack (angle between the incident air flow and the flat surface of the vortex generator) of 0° and a wind speed of 150 mph. A small area of icing built up. As the sample was rotated to a 15° angle of attack, the ice shed away in small chunks and no additional accumulation was seen.

A second test was conducted at 15° F. at a windspeed of 150 mph starting at an angle of attack of 15°. Small accumulations of ice began to build at the front of the sample. As the sample was moved from 15° angle of attack to 0° and back to 15°, the small accumulation of ice shed off and the sample showed little accumulation.

In the specification and example, there have been disclosed typical preferred embodiments of the invention and, although specific terms are employed, they are used in a generic and descriptive sense only and not for purposes of limitation of the scope of the invention set forth in the following claims.

That which is claimed is:

1. An anti-icing composition, comprising:
 a) a glassy matrix formed by crosslinking a mixture of a functionally-terminated silicone and an alkoxy-functionalized siloxane to provide an interpenetrating polymer network of glass and silicone;
 b) at least two materials capable of microphase separation, at least one of which is graftable to the glassy matrix; and
 c) a freezing point depression agent.

2. The anti-icing composition according to claim 1, wherein the functionally-terminated silicone is a silanol terminated, vinyl terminated or amine-terminated polydimethylsiloxane.

3. The anti-icing composition according to claim 1, wherein the alkoxy-functionalized siloxane is selected from the group consisting of polydiethoxysiloxane, polydimethoxysiloxane, tetramethoxy silane and tetraethoxy silane.

4. The anti-icing composition according to claim 1, wherein one of the materials capable of microphase separation and graftable into the glassy matrix is vinyl-terminated polydimethylsiloxane polymer reacted with dimethylethoxy silane or 1,1,3,3 tetramethyl disiloxane and triethyl silane using a hydrosilylation reaction.

5. The anti-icing composition according to claim 1, wherein the freezing point depression agent is a polyol, salt or choline or mixture thereof.

6. The anti-icing composition according to claim 5, wherein the freezing point depression agent is a mixture of glycerol and magnesium chloride hexahydrate.

7. The anti-icing composition according to claim 1, wherein the glassy matrix is crosslinked using an organotitanate or tin catalyst agent.

8. A substrate coated with the anti-icing composition according to claim 1.

9. An anti-icing composition, comprising:
 (a) 20 to 90 percent by weight of a glassy matrix formed by crosslinking a mixture of a functionally-terminated silicone and an alkoxy-functionalized siloxane to provide an interpenetrating polymer network of glass and silicone;
 (b) 1 to 30 percent by weight of at least two materials capable of microphase separation, at least one of which is graftable to the glassy matrix; and
 (c) 0.1 to 50 percent by weight of a freezing point depression agent.

10. The anti-icing composition according to claim 9, wherein the functionally-terminated silicone is a silanol-terminated, vinyl-terminated or amine-terminated polydimethylsiloxane.

11. The anti-icing composition according to claim 9, wherein the alkoxy-functionalized siloxane is selected from the group consisting of polydiethoxysiloxane, polydimethoxysiloxane, tetramethoxy silane and tetraethoxy silane.

12. The anti-icing composition according to claim 9, wherein one of the materials capable of microphase separation and graftable into the glassy matrix is vinyl terminated polydimethylsiloxane polymer reacted with dimethylethoxy silane or 1,1,3,3 tetramethyl disiloxane and triethyl silane using a hydrosilylation reaction.

13. The anti-icing composition according to claim 9, wherein the freezing point depression agent is a polyol, salt or choline or mixture thereof.

14. The anti-icing composition according to claim 13, wherein the freezing point depression agent is a mixture of glycerol and magnesium chloride hexahydrate.

15. The anti-icing composition according to claim 9, wherein the glassy matrix is crosslinked using an organotitanate or tin catalyst agent.

16. A substrate coated with the anti-icing composition according to claim 9.

17. An anti-icing composition, comprising:
a) a glassy matrix formed by crosslinking a mixture of an epoxy, an alkoxy-functionalized siloxane, and a compound capable of compatibilizing the epoxy and the alkoxy-functionalized siloxane to provide an epoxy-modified interpenetrating polymer network of glass and epoxy;
b) at least two materials capable of microphase separation, at least one of which is graftable to the glassy matrix; and
c) a freezing point depression agent.

18. The anti-icing composition according to claim 17, wherein the alkoxy-functionalized siloxane is selected from the group consisting of polydiethoxysiloxane, polydimethoxysiloxane, tetramethoxy silane and tetraethoxy silane.

19. The anti-icing composition according to claim 17, wherein one of the materials capable of microphase separation and graftable into the glassy matrix is vinyl-terminated polydimethylsiloxane polymer reacted with dimethylethoxy silane and triethyl silane using a hydrosilylation reaction.

20. The anti-icing composition according to claim 17, wherein the freezing point depression agent is a polyol or a salt hydrate or mixture thereof.

21. The anti-icing composition according to claim 20, wherein the freezing point depression agent is a mixture of glycerol and magnesium chloride hexahydrate.

22. The anti-icing composition according to claim 17, wherein the epoxy is selected from the group consisting of a polyglycidyl ether of a polyhydric polyol, polybisphenol A-epichlorohydrin glycidyl end-capped and polybisphenol F-epichlorohydrin glycidyl end-capped.

23. The anti-icing composition according to claim 17, wherein the compound capable of compatibilizing the epoxy and the alkoxy-functionalized silane is 3-aminopropyl triethoxy silane or (3-glycidoxypropyl) trimethoxy silane.

24. The anti-icing composition according to claim 17, wherein the glassy matrix is crosslinked using an organotitanate or tin catalyst agent.

25. A substrate coated with the anti-icing composition according to claim 17.

26. An anti-icing composition, comprising:
(a) 20 to 90 percent by weight of a glassy matrix formed by crosslinking a mixture of an epoxy, an alkoxy-functionalized siloxane, and a compound capable of compatibilizing the epoxy and the alkoxy-functionalized siloxane to provide an epoxy-modified interpenetrating polymer network of glass and epoxy;
(b) 1 to 30 percent by weight of at least two materials capable of microphase separation, at least one of which is graftable to the glassy matrix; and
(c) 0.1 to 50 percent by weight of a freezing point depression agent.

27. The anti-icing composition according to claim 26, wherein the alkoxy-functionalized siloxane is selected from the group consisting of polydiethoxysiloxane, polydimethoxysiloxane, tetramethoxy silane and tetraethoxy silane.

28. The anti-icing composition according to claim 26, wherein one of the materials capable of microphase separation and graftable into the glassy matrix is vinyl terminated polydimethylsiloxane polymer reacted with dimethylethoxy silane or 1,1,3,3 tetramethyl disiloxane and triethyl silane using a hydrosilylation reaction.

29. The anti-icing composition according to claim 26, wherein the freezing point depression agent is a polyol, salt or choline or mixture thereof.

30. The anti-icing composition according to claim 29, wherein the freezing point depression agent is a mixture of glycerol and magnesium chloride hexahydrate.

31. The anti-icing composition according to claim 26, wherein the epoxy is selected from the group consisting of a polyglycidyl ether of a polyhydric polyol, polybisphenol A-epichlorohydrin glycidyl end-capped and polybisphenol F-epichlorodydrin glycidyl end-capped.

32. The anti-icing composition according to claim 26, wherein the glassy matrix is crosslinked using an organotitanate or tin catalyst agent.

33. A substrate coated with the anti-icing composition according to claim 26.

34. A method of treating a substrate to prevent icing, the method comprising the steps of
(a) applying to the substrate an anti-icing composition comprising a glassy matrix comprising a mixture of a functionally-terminated silicone and an alkoxy-functionalized siloxane; at least two materials capable of microphase separation, at least one of which is graftable to the glassy matrix and a freezing point depression agent; and
(b) crosslinking the glassy matrix.

35. The method according to claim 34, wherein the glassy matrix is crosslinked using an organotitanate or tin catalyst agent.

36. A method of treating a substrate to prevent icing, the method comprising the steps of:
(a) applying to the substrate an anti-icing composition comprising a glassy matrix comprising a mixture of an epoxy, an alkoxy-functionalized siloxane, and a compound capable of compatibilizing the epoxy and the alkoxy-functionalized siloxane to provide an epoxy-modified interpenetrating polymer network of glass and epoxy, and a freezing point depression agent; and
(b) crosslinking the glassy matrix.

37. The method according to claim 34, wherein the glassy matrix is crosslinked using an organotitanate or tin catalyst agent.

38. A kit for treating a substrate to provide anti-icing properties to the substrate, the kit comprising an anti-icing composition comprising a crosslinkable glassy matrix comprising a mixture of a functionally-terminated silicone and an alkoxy-functionalized siloxane, at least two materials capable of microphase separation, at least one of which is graftable to the glassy matrix, and a freezing point depression agent; and a crosslinking agent.

39. A kit according to claim 38, wherein the functionally-terminated silicone is selected from the group consisting of silanol terminated, vinyl terminated and amine terminated polydimethylsiloxane.

40. A kit according to claim 38, wherein the alkoxy-functionalized siloxane is selected from the group consisting of polydiethoxysiloxane, polydimethoxysiloxane, tetramethoxy silane and tetraethoxy silane.

41. A kit according to claim 38, wherein one of the materials capable of microphase separation and graftable into the glassy matrix is vinyl terminated polydimethylsiloxane polymer reacted with dimethylethoxy silane or 1,1,3,3 tetramethyl disiloxane and triethyl silane using a hydrosilylation reaction.

42. The anti-icing composition according to claim 38, wherein the freezing point depression agent is a polyol, salt or choline or mixture thereof.

43. The anti-icing composition according to claim 42, wherein the freezing point depression agent is a mixture of glycerol and magnesium chloride hexahydrate.

44. A kit according to claim 41, wherein the crosslinking agent is an organotitanate or a tin catalyst.

45. A kit for treating a substrate to provide anti-icing properties to the substrate, the kit comprising an anti-icing composition comprising: a glassy matrix formed by crosslinking a mixture of an epoxy, an alkoxy-functionalized siloxane, and a compound capable of compatibilizing the epoxy and the alkoxy-functionalized silaxane to provide an epoxy-modified interpenetrating polymer network of glass and epoxy; at least two materials capable of microphase separation, at least one of which is graftable to the glassy matrix; and a freezing point depression agent.

46. The kit according to claim 45, wherein the alkoxy-functionalized siloxane is selected from the group consisting of polydiethoxysiloxane, polydimethoxysiloxane, tetramethoxy silane and tetraethoxy silane.

47. The kit according to claim 45, wherein one of the materials capable of microphase separation and graftable into the glassy matrix is vinyl-terminated polydimethylsiloxane polymer reacted with dimethylethoxy silane or 1,1,3,3 tetramethyl disiloxane and triethyl silane using a hydrosilylation reaction.

48. The kit according to claim 45, wherein the freezing point depression agent is a polyol, salt or choline or mixture thereof.

49. The kit according to claim 45, wherein the freezing point depression agent is a mixture of glycerol and magnesium chloride hexahydrate.

50. The kit according to claim 45, wherein the epoxy is selected from the group consisting of a polyglycidyl ether of a polyhydric polyol, polybisphenol A-epichlorohydrin glycidyl end-capped and polybisphenol F-epichlorodydrin glycidyl end-capped.

51. The kit according to claim 45, wherein the compound capable of compatibilizing the epoxy and the alkoxy-functionalized silane is 3-aminopropyl triethoxy silane or (3-glycidoxypropyl) trimethoxy silane.

52. The kit according to claim 45, further including a crosslinking agent which is an organotitanate or tin catalyst agent.

* * * * *